US007477673B2

(12) United States Patent
Ziener et al.

(10) Patent No.: US 7,477,673 B2
(45) Date of Patent: Jan. 13, 2009

(54) ARRANGEMENT FOR GENERATING EXTREME ULTRAVIOLET RADIATION BASED ON AN ELECTRICALLY OPERATED GAS DISCHARGE

(75) Inventors: Christian Ziener, Jena (DE); Guido Hergenhan, Grossloebichau (DE); Frank Flohrer, Jena (DE); Carsten Thode, Stadtroda (DE)

(73) Assignee: XTREME technologies GmbH, Jena (DE)

( * ) Notice: Subject to any disclaimer, the term of this patent is extended or adjusted under 35 U.S.C. 154(b) by 0 days.

(21) Appl. No.: 11/693,169

(22) Filed: Mar. 29, 2007

(65) Prior Publication Data

US 2007/0228299 A1 Oct. 4, 2007

(30) Foreign Application Priority Data

Mar. 31, 2006 (DE) ...................... 10 2006 015 640

(51) Int. Cl.
*H01S 3/097* (2006.01)

(52) U.S. Cl. .......................................... 372/87; 372/86

(58) Field of Classification Search .................. 372/86, 372/87, 70, 81, 82
See application file for complete search history.

(56) References Cited

U.S. PATENT DOCUMENTS

2007/0158594 A1 * 7/2007 Shirai et al. ............. 250/504 R

FOREIGN PATENT DOCUMENTS

WO 2005/025280 3/2005

* cited by examiner

*Primary Examiner*—Armando Rodriguez
(74) *Attorney, Agent, or Firm*—Reed Smith LLP

(57) ABSTRACT

The object of the invention in an arrangement for generating extreme ultraviolet radiation based on an electrically operated gas discharge is to reduce the time required for charging the electrodes by reducing the inductance of the discharge circuit. A high-voltage power supply connected to the electrodes which are constructed as disk electrodes and are rotatably mounted has a capacitor battery comprising capacitor elements which are arranged along a ring concentric to the axis of rotation of the electrodes with a ring plane directed parallel to the disk surface. Electrical connections are guided to the disk surfaces from the capacitor elements along a ring concentric to the axis of rotation.

19 Claims, 4 Drawing Sheets

ARRANGEMENT FOR GENERATING EXTREME ULTRAVIOLET RADIATION BASED ON AN ELECTRICALLY OPERATED GAS DISCHARGE

CROSS-REFERENCE TO RELATED APPLICATIONS

This application claims priority of German Application No. 10 2006 015 640.4, filed Mar. 31, 2006, the complete disclosures of which are hereby incorporated by reference.

BACKGROUND OF THE INVENTION a) Field of the Invention

The invention is directed to an arrangement for generating extreme ultraviolet radiation based on an electrically operated gas discharge with a discharge chamber, which has a discharge area for a gas discharge for forming a plasma that emits the radiation, a first disk-shaped electrode and a second disk-shaped electrode, at least one of which is mounted so as to be rotatable, an energy beam source for providing an energy beam, and a high-voltage power supply connected to the electrodes for generating high-voltage pulses.

b) Description of the Related Art

The invention is applied as a light source of short-wavelength radiation, preferably for EUV lithography in the fabrication of integrated circuits. However, it can also be used for incoherent light sources in other spectral ranges from soft x-ray to infrared.

Radiation sources which are based on plasmas generated by gas discharge and which rely on various concepts have already been described many times. The principle common to these arrangements consists in that a pulsed high-current discharge is ignited in a gas of determinate density, and a very hot and dense plasma is generated locally as a result of the dissipated power in the ionized gas.

Since the heated plasma emits not only radiation but also high-energy ions, debris mitigation tools, as they are called, are provided particularly for protecting collector optics which make the radiation emitted more or less homogeneously in all spatial directions available for applications such as wafer exposure.

When gases are used in the debris mitigation tools for deceleration of the high-energy ions, the required gas pressure also leads to an increase in the background pressure in the region of the electrode arrangement. As soon as the breakdown voltage decreases as a result below the operating voltage of the gas discharge, avalanche ionization causes parasitic discharges so that less energy can be dissipated in the actual gas discharge.

Therefore, it is necessary to charge the electrodes to the operating voltage of the discharge within a shorter period of time than that required by the avalanche ionization for a parasitic breakdown. This means that the recharging time $\tau=\pi\sqrt{LC}$ from the final capacitor—usually constructed as a capacitor battery—of the high-voltage power supply to the electrode must be shortened. Since the stored energy E depends on the capacitance of the capacitor and on the applied voltage, as expressed by $$E=\frac{1}{2}CU^2,$$

the capacitance C cannot be reduced to any desired value when a definite energy must be provided for the gas discharge and the voltage must not be driven up extremely high. Therefore, the inductance L of the discharge circuit, which is made up of the line inductance, the self-inductances of the electrode arrangement and the capacitance C, must be maintained as low as possible.

In a previously known device according to WO 2005/025280 A2 which uses rotating electrodes that dip into a vessel containing molten metal, an additional metal screen which is arranged as nearly as possible between the electrodes to prevent the penetration of a magnetic field through eddy currents during the discharge is suggested as a low-inductance circuit. However, owing to the fact that the current pulse is conveyed to the electrodes by the molten metal in that the capacitors needed for storing the electrical energy for plasma generation are electrically connected to the molten metal in the vessels by means of a plurality of metal pins or strips which are embedded in a vacuum-tight manner in insulators, a high inductance results because of the required current supply to the electrodes.

Therefore, there is a need to reduce the time required for charging the electrodes by reducing the inductance of the discharge circuit.

This need is met in an arrangement for generating extreme ultraviolet radiation based on an electrically operated gas discharge of the type mentioned above in that the high-voltage power supply has a capacitor battery comprising capacitor elements which are arranged along a ring concentric to the axis of rotation with a ring plane directed parallel to the disk surface, and electrical connections are guided to the disk surfaces from the capacitor elements along a ring concentric to the axis of rotation.

Particularly advisable and advantageous constructions and further developments of the arrangement according to the invention are indicated in the dependent claims.

Due to the contact over a large outer radius and the resulting reduction in self-inductance, the invention makes it possible to operate with a higher gas pressure because the electrodes can be charged faster.

In contrast to WO 2005/025280, in which the inductance is determined by a discharge circuit similar to a double line, the substantially lower inductance of the discharge circuit in the invention corresponds to that of a toroidal coil with one winding so that the energy can be transferred from the final capacitor battery in the high-voltage power supply to the electrodes in less than 1 μs and can be made usable for the gas discharge.

It is possible to recharge the energy from a capacitor battery arranged upstream to this final capacitor battery by means of magnetic pulse compression. This means that saturable inductances having a very high relative permeability ($\mu_r\approx12000$) are used for pulse shortening and therefore initially cause a substantial delay in the recharging of the electrical energy. In the presence of a magnetic field, however, the relative permeability is sharply reduced ($\mu_r\approx2$) and a fast recharging of the energy is possible so that with a suitable layout of the capacitors and the saturable inductances the electric pulse can be shortened by more than a factor of 10.

The rotary electrode arrangement according to the invention in which the disk-shaped electrodes are rigidly connected at a distance from one another to a rotatably mounted shaft allows current pulses to be supplied to the electrodes without wear and, above all, with low inductance.

Therefore, the invention can be constructed in such a way that the electrical connections leading to the disk surfaces have contact elements which are oriented coaxial to the axis of rotation and which are immersed in ring-shaped baths of molten metal which are electrically separated from one another and which communicate with the capacitor elements of the high-voltage power supply.

In a preferred constructional variant of the invention, one electrode has, as contact element, a plurality of individual contacts which are electrically connected to the disk surface of the one electrode along a ring and are guided through openings in the other electrode so as to be electrically insulated, and the contact element of the other electrode is constructed as a closed cylinder ring placed on the disk surface.

As an alternative to the construction mentioned above, the electrical connections can also be guided from the capacitor elements to the disk surfaces via sliding contacts.

The capacitor battery can be arranged inside or outside the discharge chamber. In the latter arrangement, the discharge chamber has vacuum feedthroughs through which the electrical connections are guided.

Also, the shaft to which the electrodes are connected can be guided into the discharge chamber via a vacuum feedthrough and driven by driving means arranged outside the vacuum chamber.

It is advantageous when the shaft has at least one bore hole in longitudinal direction for moving coolant to the electrodes. Coolant is guided into the electrodes through cooling channels at a pressure between 1 bar and 30 bar.

It is also possible for each disk-shaped electrode to be rigidly connected to a respective rotatably mounted shaft, these shafts having a common axis of rotation and identical rotational speeds so that the position of the electrodes relative to one another does not change during the rotation. This is important because it is also necessary in this construction to guide the contact of one electrode through corresponding openings in the other electrode. This construction of the invention has advantages above all when the coolant is supplied to the electrodes via the shafts so that a shaft is available for supplying coolant to each electrode.

Further, the invention can be constructed in such a way that an injection device is directed to the discharge area. At a repetition rate corresponding to the frequency of the gas discharge, this injection device provides a series of individual volumes of an emitter material serving to generate radiation, and the individual volumes are limited in amount so that the emitter material which is injected into the discharge area at a distance from the electrodes is entirely in the gas phase after the discharge. The energy beam supplied by the energy beam source is directed synchronous in time with the frequency of the gas discharge to a plasma generation site in the discharge area which is provided at a distance from the electrodes and in which the individual volumes arrive so as to be ionized successively by the energy beam.

The surface erosion of the electrodes can be countered when at least one of the electrodes has in the edge area a layer of a continuously applied molten metal and the edge area has at least one receiving area which extends circumferentially in a closed manner along the edge of the electrode on the electrode surface and which is constructed so as to be wetting for the molten metal and to which a device for introducing the metal is directed.

The invention will be described more fully in the following with reference to the schematic drawings.

DESCRIPTION OF THE PREFERRED EMBODIMENTS

Figure 1:
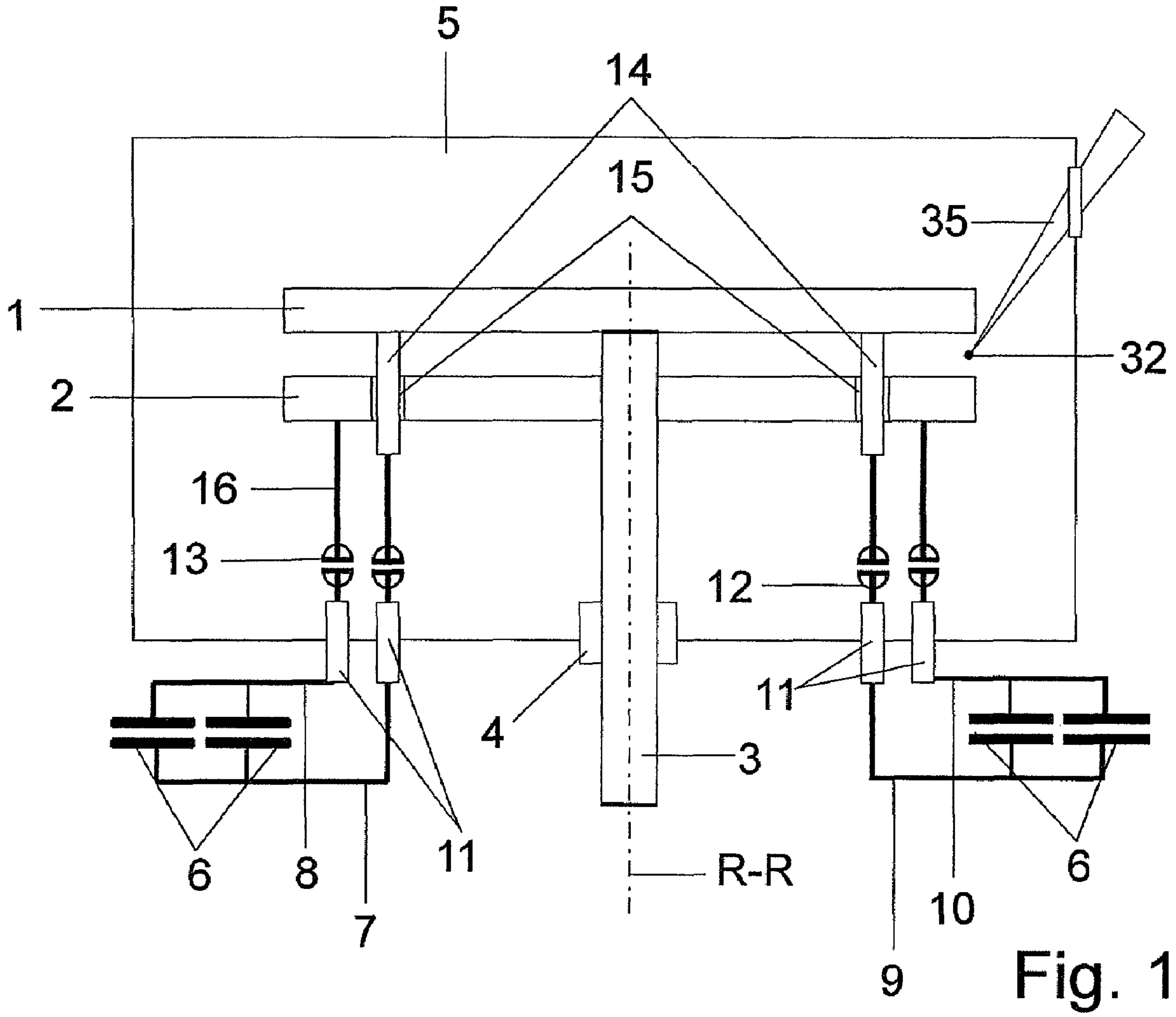
FIG. 1 shows a rotary electrode arrangement with a capacitor battery which is connected according to a first construction.

In the construction shown in FIG. 1, a first disk-shaped electrode 1 and a second disk-shaped electrode 2 whose surfaces are oriented parallel to one another are electrically isolated from one another at a distance and are rigidly connected to a rotatably mounted shaft 3 in such a way that the center axes of symmetry of the electrodes 1, 2 coincide with the axis of rotation R-R of the shaft 3.

The shaft 3 is guided through a vacuum rotary feedthrough 4 into a vacuum chamber 5 so that the electrodes 1, 2 accommodated therein can be set in rotation.

Alternatively, instead of the rotary feedthrough 4, a magnetic coupling can also be provided for transmitting force into the discharge chamber 5.

A capacitor battery comprising capacitor elements 6 and serving as the final capacitor in a high-voltage power supply is provided outside of the discharge chamber 5. According to the invention, the capacitor elements 6 are so arranged along a ring concentric to the axis of rotation R-R that the ring plane is oriented parallel to the disk surfaces of the electrodes 1, 2. Electric connections 7 to 10 coming from the capacitor elements are guided to the disk surfaces along a ring concentric to the axis of rotation R-R.

In the construction according to FIG. 1, this is carried out in that the electrical connections 7 to 10 which are guided into the vacuum chamber 5 through vacuum feedthroughs 11 have circular sliding contacts 12, 13 which are guided in turn to the disk surfaces along a ring which is concentric to the axis of rotation R-R. For this purpose, the electrode 1 at the top with reference to the horizontal operating position has a plurality of bolt-shaped or pin-shaped individual contacts 14 which are electrically connected to the disk surface along a ring and to the sliding contact 12 through openings 15 in the bottom electrode 2 so as to be electrically insulated. The contact element of the bottom electrode 2 can likewise comprise individual contacts, but can also be connected to the sliding contact 13 as a closed cylinder ring 16 placed on the disk surface.

Figure 2:
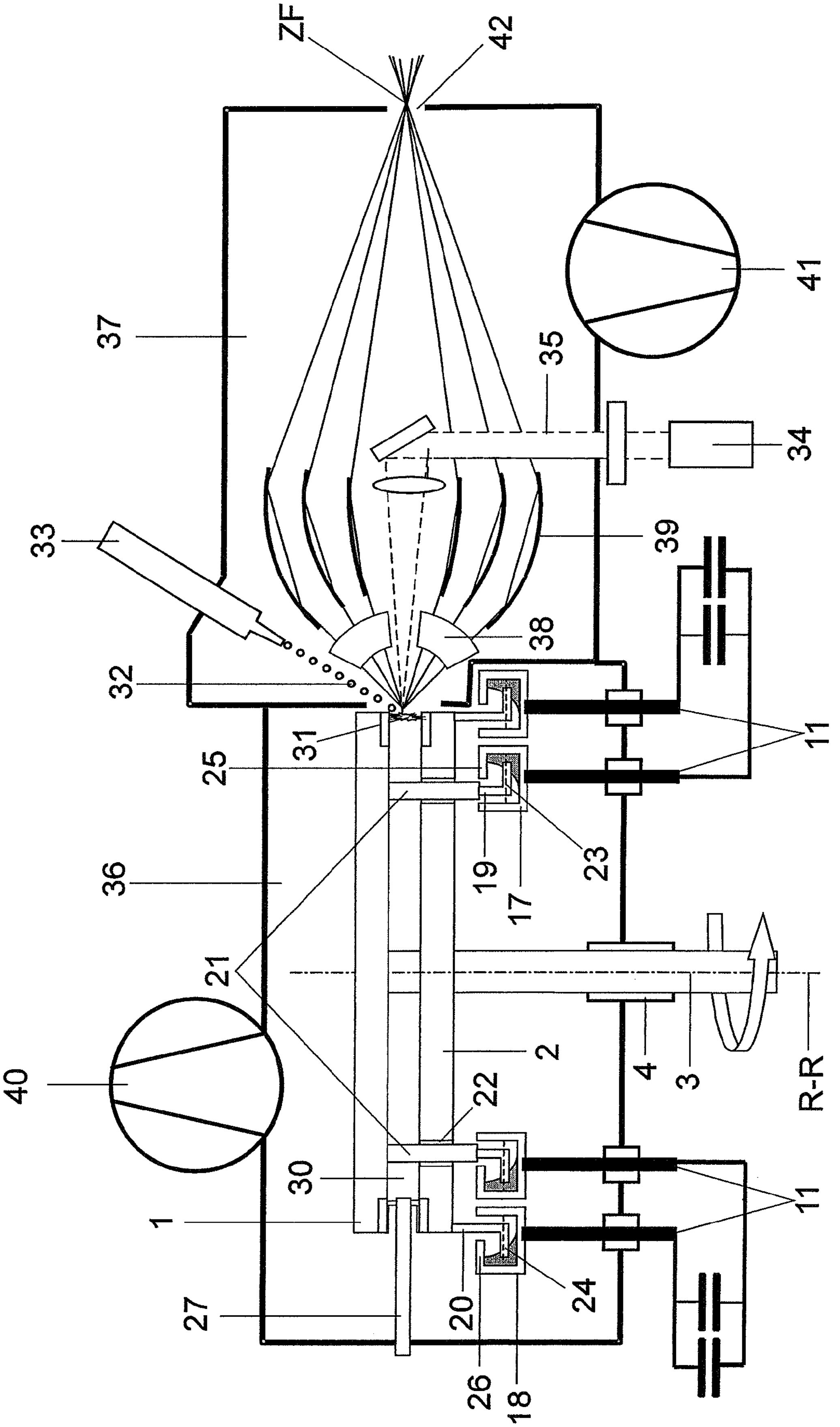
FIG. 2 shows a radiation source, including the collector mirror and vacuum chambers needed therefor, with a rotary electrode arrangement according to the invention in which the capacitor battery is connected according to a second construction.
Figure 3:
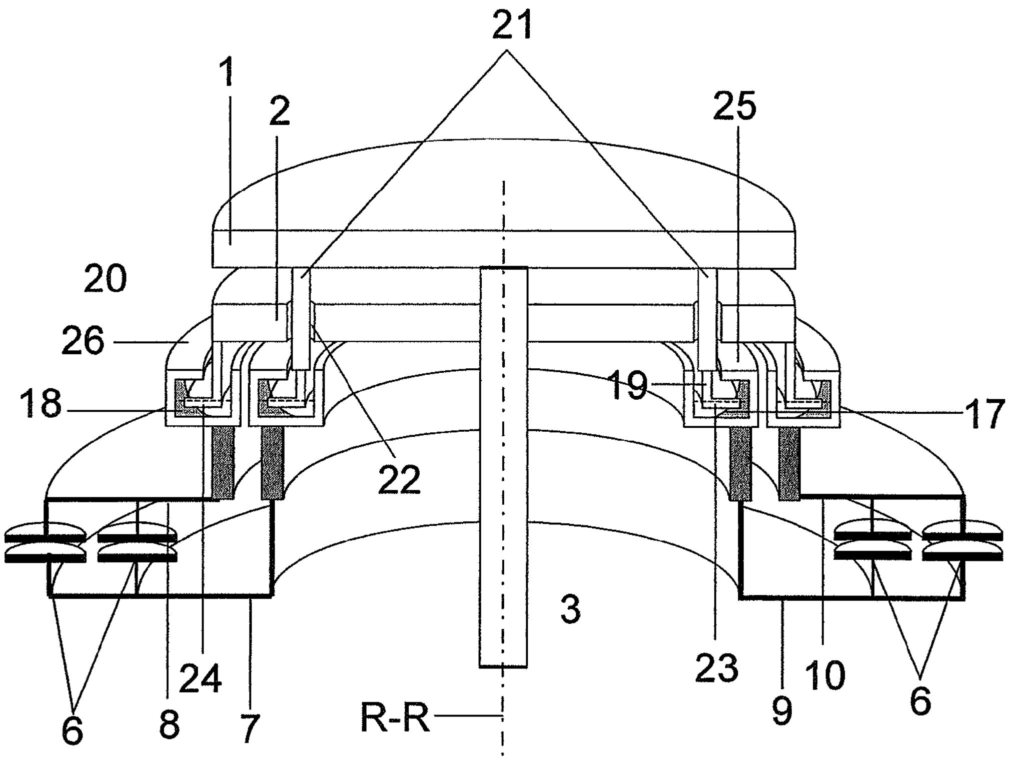
FIG. 3 shows another view of the rotary electrode arrangement according to the invention shown in FIG. 2.

To transfer the electrical energy to the electrodes 1, 2, the second construction shown in FIGS. 2 and 3 uses annular molten metal baths 17, 18 which are electrically separated from one another and which communicate with the capacitor elements 6 in that contact elements which are oriented coaxial to the axis of rotation R-R are arranged at the disk surfaces and are immersed in the melt baths 17, 18 as cylinder-ring-shaped immersion elements 19, 20. Similar to the construction according to FIG. 1, the top electrode 1 has a plurality of bolt-shaped or pin-shaped individual contacts 21 which are electrically connected to the disk surface along a ring and to the cylinder-ring-shaped immersion element 19 through openings 22 in the bottom electrode 2 so as to be electrically insulated.

The contact element of the bottom electrode 2 is formed by the cylinder-ring-shaped immersion element 20 itself, which is set directly upon the disk surface.

Bent ends 23, 24 of the immersion elements 19, 20 and suitable partial covers of the melt baths 17, 18 in the form of inwardly turned outer walls 25, 26 prevent the molten metal that is pushed outward from exiting the vessels for the melt baths 17, 18. Low-melting metals with a low vapor pressure at the respective operating temperature are preferably used as metal melts, especially tin, gallium, or low-melting alloys.

Further, FIG. 2 shows a coating device 27 which is directed to an edge track of each of the disk surfaces that face one another. The edge tracks are constructed so as to be wetting for a molten metal to be applied as a coating during the rotation of the electrodes 1, 2.

The coating device 27 is designed so as to prevent electrical contact between the electrodes 1 and 2 via the coating device. In this construction, the molten metal is provided primarily as a protective coating for the electrodes 1, 2 in order to prevent damage to the electrodes due to erosion (electrode consumption) so that the life of the electrodes 1, 2 is appreciably lengthened. However, it can also serve as emitter material for the plasma to be generated.

In the present invention, the emitter material, e.g., xenon, tin, tin alloys, tin solutions or lithium, must be changed into a pre-ionized state before the gas discharge by evaporation, and the vapor is used in the ignition of the plasma 31.

Therefore, the emitter material is introduced into the discharge area in the form of individual volumes 32 at a repetition rate corresponding at least to the repetition rate of the gas discharge, particularly at a location in the discharge area which is provided at a distance from the electrodes 1, 2 and at which the plasma generation is carried out. The individual volumes are preferably provided as a continuous flow of droplets in dense, i.e., solid or liquid, form by an injection device 33 which is directed to the discharge area. Owing to a well-defined limiting of the amount of the individual volume, the emitter material is entirely in gaseous phase after the discharge and can be easily removed. The repetition rate at which the individual volumes 32 are provided by the injection device 33 and which corresponds to the gas discharge ensures that no "superfluous" individual volumes reach the discharge area.

A pulsed energy beam 35 which is provided by an energy beam source 34 and which is preferably a laser beam of a laser radiation source is directed to the plasma generation site so as to be synchronized with respect to time with the frequency of the gas discharge so that the individual volumes 32 in the form of droplets are successively evaporated as they flow through the plasma generation site.

The radiation source shown in FIG. 2 is divided into a source chamber 36 with the rotary electrode arrangement according to the invention and a collector chamber 37 in which a debris suppression device 38 and collector optics 39 are accommodated. Vacuum pumps 40, 41 serve to evacuate the two chambers.

After passing through the debris suppression device 38, the radiation emitted by the hot plasma 31 reaches the collector optics 39 which direct the radiation to a beam outlet opening 42 in the collector chamber 39. Imaging the plasma 31 by means of the collector optics 39 generates an intermediate focus ZF which is localized in or in the vicinity of the beam outlet opening 42 and which serves as an interface to exposure optics, not shown, in a semiconductor exposure installation for which the radiation source, preferably constructed for the EUV wavelength region, can be provided.

Figure 4:
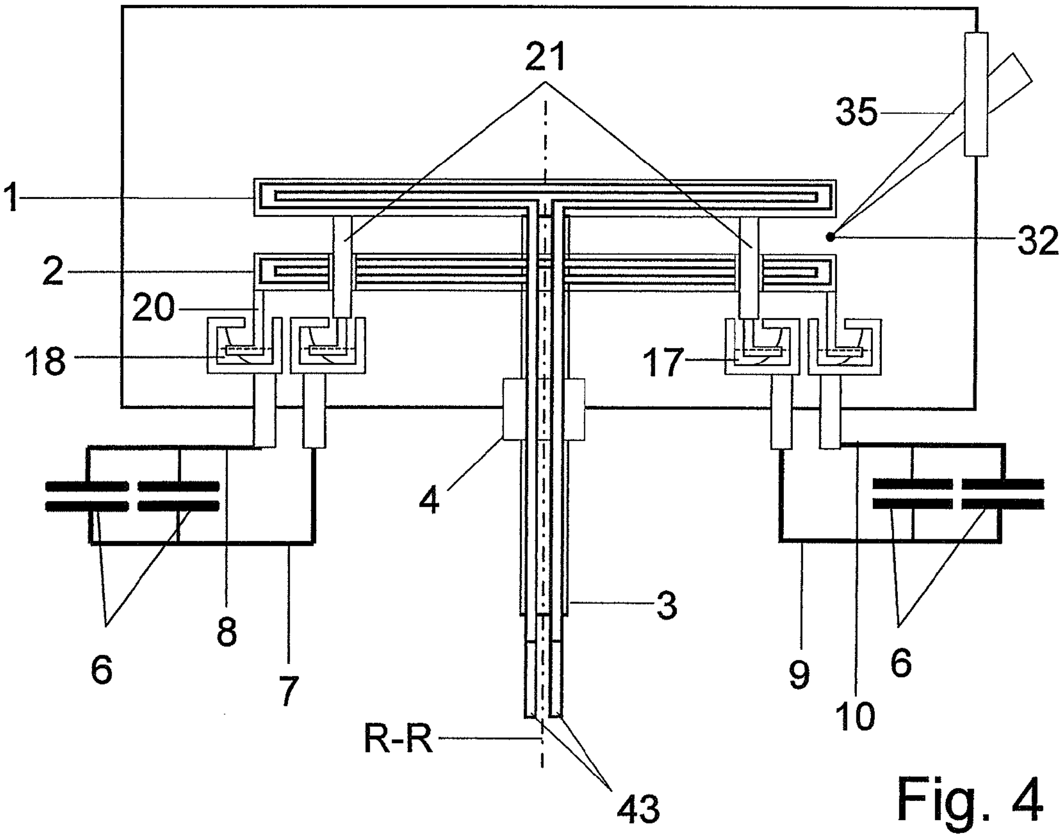
FIG. 4 shows a rotary electrode arrangement which is outfitted with a cooling arrangement.

According to FIG. 4, another advantageous construction of the invention has a cooling arrangement by which the heat occurring during the gas discharge is removed from the electrodes 1, 2 through cooling channels 43 which are guided through the shaft 3 in the electrodes 1, 2. The shaft 3 is guided through a rotary feedthrough 4 in this construction.

Figure 5:
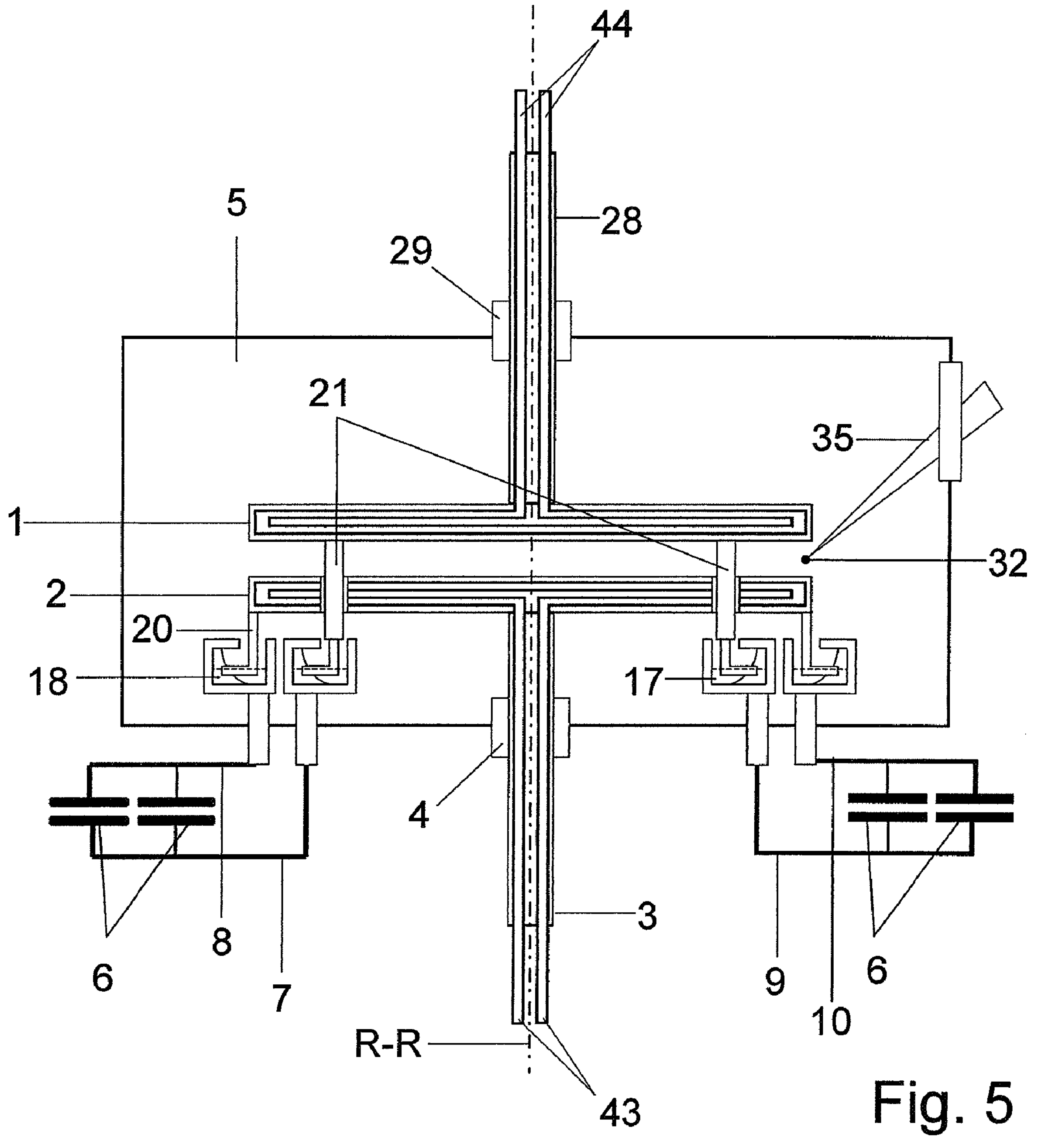
FIG. 5 shows another rotary electrode arrangement outfitted with a cooling arrangement.

In the other advantageous construction of the rotary electrode arrangement according to the invention which is shown in FIG. 5, the two electrodes 1 and 2 are connected to shafts 3 and 28 which are separate from one another but mounted so as to be rotatable around a common axis of rotation R-R and which are guided into the vacuum chamber 5 through rotary feedthroughs 4 and 29. This construction has the advantage that the supply of coolant via cooling channels 43, 44 is carried out separately for the electrodes 1, 2.

Identical rotational speeds of the shafts 3 and 28 ensure that the position of the electrodes relative to one another is always maintained constant in order to prevent electrical contact between the individual contacts 21 of the top electrode 1 and the walls of the openings 22 in the bottom electrode 2.

While the foregoing description and drawings represent the present invention, it will be obvious to those skilled in the art that various changes may be made therein without departing from the true spirit and scope of the present invention.

What is claimed is:

1. An arrangement for generating extreme ultraviolet radiation based on an electrically operated gas discharge comprising:

a discharge chamber, having a discharge area for a gas discharge for forming a plasma that emits the radiation;

a first disk-shaped electrode and a second disk-shaped electrode, at least one of which being mounted so as to be rotatable about an axis of rotation;

an energy beam source for directing an energy beam to the discharge area;

a high-voltage power supply connected to the electrodes for generating high-voltage pulses;

said high-voltage power supply having a capacitor battery comprising a plurality of parallel connected capacitor elements which are arranged along at least one ring concentric to said axis of rotation and arranged in a ring plane being parallel to the disk-shaped electrodes; and electrical connections being guided from the capacitor elements to each of the disk-shaped electrodes along separate rings being concentric to the axis of rotation.

2. The arrangement according to claim 1, wherein the disk-shaped electrodes are rigidly connected at a distance from one another to a rotatably mounted shaft.

3. The arrangement according to claim 1, wherein each disk-shaped electrode is rigidly connected to a respective rotatably mounted shaft, these shafts having a common axis of rotation and identical rotational speeds so that the electrodes have a relative position to one another that does not change during the rotation.

4. The arrangement according to claim 2, wherein the electrical connections lead to surfaces of the disk-shaped electrodes, the disk surfaces having contact elements which are oriented coaxial to the axis of rotation and immersed in ring-shaped baths of molten metal which are electrically separated from one another and which communicate with the capacitor elements of the high-voltage power supply.

5. The arrangement according to claim 2, wherein the electrical connections are guided from the capacitor elements to surfaces of each disk-shaped electrode via sliding contacts.

6. The arrangement according to claim 4, wherein one electrode has, as contact element, a plurality of individual contacts which are electrically connected to the disk surface of the one electrode along a ring and are guided through openings in the other electrode so as to be electrically insulated, and wherein the contact element of the other electrode is constructed as a closed cylinder ring placed on the disk surface.

7. The arrangement according to claim 1, wherein the capacitor battery is arranged inside the discharge chamber.

8. The arrangement according to claim 1, wherein the capacitor battery is arranged outside the discharge chamber, and wherein the discharge chamber has vacuum feedthroughs through which the electrical connections are guided.

9. The arrangement according to claim 1, wherein rotatable shafts to which the electrodes are connected are guided into the discharge chamber via a vacuum feedthrough and are driven by driving means arranged outside the discharge chamber.

10. The arrangement according to claim 9, wherein the shafts have at least one bore hole in longitudinal direction for moving coolant to the electrodes.

11. The arrangement according to claim 10, wherein the electrodes have a cooling channel through which coolant is guided at a pressure between 1 bar and 30 bar.

12. The arrangement according to claim 9, wherein a magnetic coupling is provided for transmitting force to the shafts to which the electrodes are connected.

13. The arrangement according to claim 1, wherein an injection device is directed to the discharge area, the injection device providing, at a repetition rate corresponding to a frequency of the gas discharge, a series of individual volumes of an emitter material serving to generate radiation, wherein the individual volumes are limited in amount so that the emitter material which is injected at a distance from the electrodes into the discharge area is entirely vaporized through the discharge.

14. The arrangement according to claim 13, wherein the energy beam supplied by the energy beam source is directed synchronous in time with the frequency of the gas discharge to a plasma generation site in the discharge area which is provided at a distance from the electrodes and in which the individual volumes arrive so as to be ionized successively by the energy beam.

15. The arrangement according to claim 14, wherein xenon is used as emitter material.

16. The arrangement according to claim 14, wherein tin or a tin compound is used as emitter material.

17. The arrangement according to claim 1, wherein at least one of the electrodes has an edge area to which a layer of a molten metal is continuously applied and which has at least one receiving area being circumferentially closed along the edge on an electrode surface and constructed so as to be wetting for the molten metal and being provided for regenerative application of the molten metal by a coating device.

18. The arrangement according to claim 17, wherein the molten metal is the emitter material.

19. The arrangement according to claim 18, wherein tin or a tin compound is provided as molten metal.

* * * * *